United States Patent
Krause

(10) Patent No.: US 8,781,838 B2
(45) Date of Patent: Jul. 15, 2014

(54) IN-VEHICLE TEXT MESSAGING EXPERIENCE ENGINE

(75) Inventor: Kevin R. Krause, Plymouth, MI (US)

(73) Assignee: General Motors, LLC, Detroit, MI (US)

( * ) Notice: Subject to any disclaimer, the term of this patent is extended or adjusted under 35 U.S.C. 154(b) by 352 days.

(21) Appl. No.: 12/852,947

(22) Filed: Aug. 9, 2010

(65) Prior Publication Data

US 2012/0035923 A1 Feb. 9, 2012

(51) Int. Cl.
*G10L 21/00* (2013.01)

(52) U.S. Cl.
USPC .......... 704/270; 717/171; 709/233; 709/206; 704/270.1; 704/260; 704/246; 704/235; 455/466; 455/435.3; 455/414.3; 455/186.2; 379/88.14; 379/52; 342/357.31; 340/539.12; 715/745; 701/1

(58) Field of Classification Search
USPC ............ 704/235, 246, 260, 270.1; 709/206, 709/233; 455/466, 414.3, 186.2; 717/171; 715/745; 701/1; 379/88.14, 52, 357.31, 379/539.12
See application file for complete search history.

(56) References Cited

U.S. PATENT DOCUMENTS

| | | | |
|---|---|---|---|
| 5,603,081 A * | 2/1997 | Raith et al. ................. 455/435.3 |
| 6,175,743 B1 * | 1/2001 | Alperovich et al. .......... 455/466 |
| 6,606,486 B1 * | 8/2003 | Cubbage et al. ........... 455/186.2 |
| 7,353,035 B1 * | 4/2008 | Kupsh et al. .................. 455/466 |
| 7,761,591 B2 * | 7/2010 | Graham ........................ 709/233 |
| 2001/0041562 A1 * | 11/2001 | Elsey et al. ................... 455/414 |
| 2002/0002461 A1 * | 1/2002 | Tetsumoto ................. 704/270.1 |
| 2002/0082752 A1 * | 6/2002 | Obradovich ..................... 701/1 |
| 2003/0126216 A1 * | 7/2003 | Avila et al. ................... 709/206 |
| 2004/0150556 A1 * | 8/2004 | Tucker et al. ............ 342/357.13 |
| 2004/0267527 A1 * | 12/2004 | Creamer et al. .............. 704/235 |
| 2005/0119019 A1 * | 6/2005 | Jang ............................. 455/466 |
| 2006/0190825 A1 * | 8/2006 | Zaag ............................. 715/745 |
| 2007/0066327 A1 * | 3/2007 | Karmakar ..................... 455/466 |
| 2007/0262860 A1 * | 11/2007 | Salinas et al. ............ 340/539.12 |
| 2008/0147397 A1 * | 6/2008 | Konig et al. ................... 704/246 |
| 2008/0235024 A1 * | 9/2008 | Goldberg et al. ............. 704/260 |
| 2010/0027765 A1 * | 2/2010 | Schultz et al. .................. 379/52 |
| 2010/0027768 A1 * | 2/2010 | Foskett ...................... 379/88.14 |
| 2010/0115505 A1 * | 5/2010 | Touati et al. .................. 717/171 |

* cited by examiner

*Primary Examiner* — Michael Colucci

(74) *Attorney, Agent, or Firm* — Leydig, Voit & Mayer, Ltd.

(57) ABSTRACT

The disclosed invention provides a system and apparatus for providing a telematics system user with an improved texting experience. A messaging experience engine database enables voice avatar/personality selection, acronym conversion, shorthand conversion, and custom audio and video mapping. As an interpreter of the messaging content that is passed through the telematics system, the system eliminates the need for a user to manually manipulate a texting device, or to read such a device. The system recognizes functional content and executes actions based on the identified functional content.

8 Claims, 4 Drawing Sheets

IN-VEHICLE TEXT MESSAGING EXPERIENCE ENGINE

BACKGROUND OF THE INVENTION

With the current and increasing popularity of texting as a form of instant communication among individuals, both for business and for pleasure, the texting experience extends into more aspects of the users' lives. For example, while texting was once infrequent enough to rarely coincide with driving activities, users are increasingly needing or desiring to engage in texting while driving.

However, the physical requirements of texting can be incompatible with the physical requirements of driving, since both activities typically require one or more hands to execute. Moreover, the unique written style of text messaging precludes the use of a typical text-to-speech engine to allow for messages to be communicated properly to a driver over the audio system. Thus, a system is needed to allow efficient and satisfying text sending and text receiving experiences for users of in-vehicle texting systems.

BRIEF SUMMARY OF THE INVENTION

The invention provides a system and method to provide users with a customizable and personalized in-vehicle text messaging experience that encourages safe driving habits. A messaging experience engine database assists the user in attaining an improved texting experience. The messaging experience engine database enables voice avatar/personality selection, acronym conversion, shorthand conversion, and custom audio and video mapping. With respect to the latter, for example, a text message may include a URL to an audio and/or video file, and employing the described principles, the system will determine how to handle this content, e.g., by retrieving and playing the indicated audio content. This action may be customized in that the user may specify the manner in which such materials are to be handled. As an interpreter of the messaging content that is passed through the telematics system, the messaging experience engine database eliminates the need for a user to manually manipulate a texting device, or to read such a device.

The system also adds value by recognizing functional content and executing actions based on the identified functional content. For example, if a message is received having content that may be interpreted as a location or address, the system will recognize this and determine how to present that information to the user.

The user is also given an option to use displays and functions in the vehicle as part of the messaging experience engine, including heads up display, driver information center, or directed audio/single speaker for private messages when other vehicle occupants are detected.

Other objects and advantages of the invention will be appreciated by those of skill in the art upon reading this description in conjunction with the included figures of which:

DETAILED DESCRIPTION OF THE INVENTION

Figure 1:
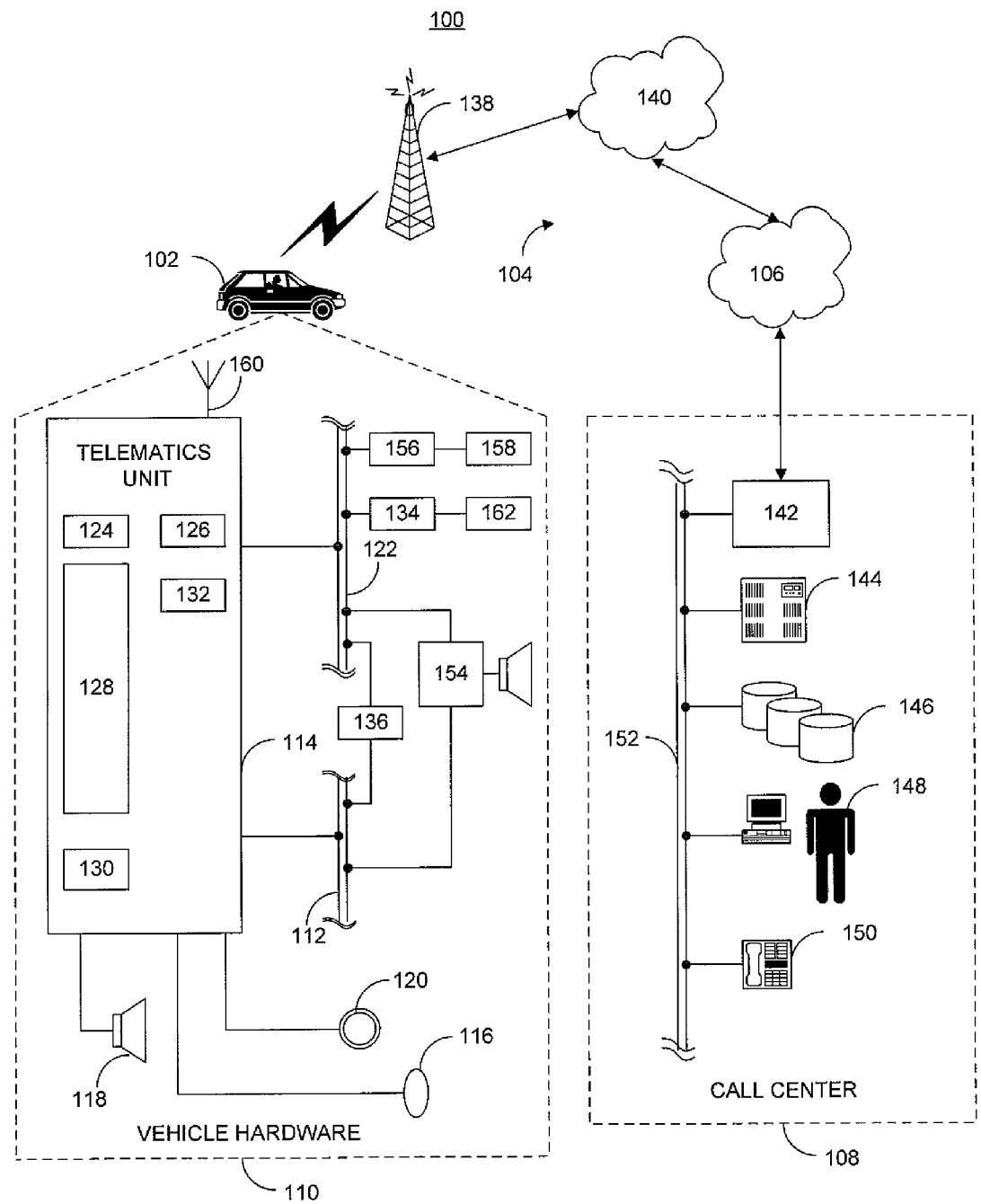
FIG. 1 is a schematic diagram of a communication system within which the described principles may be implemented.

Before discussing the details of the invention and the environment wherein the invention may be used, a brief overview is given to guide the reader. In general terms, not intended to limit the claims, the invention is directed to a system to provide users with a highly customizable and personalized in-vehicle text messaging experience that encourages safe driving habits. In particular, the described system uses the content of standard text messages to create a user-defined in-vehicle experience via an embedded system. At the same time, incoming text messages may be received by the embedded system directly or by a docked or wirelessly paired phone or other external device.

In an implementation, a messaging experience engine database (MEED) assists the user in attaining an improved texting experience. The MEED may be stored in or associated with the vehicle communications processor (VCP) and may be managed by the subscriber via a website provided by the service provider.

The MEED is constructed and configured to provide or facilitate numerous functions associated with the texting experience including voice avatar/personality selection, acronym conversion, shorthand conversion, and custom audio and video mapping. As noted above, the custom audio and video mapping allows the user to specify the way in which links in a text message referring to external content, e.g., via a URL, are to be treated. For example, a user may specify that external content is not retrieved at all, that audio content is retrieved and played, but video content is ignored, etc.

In essence, the MEED acts as an interpreter of the messaging content that is passed through the telematics system. While standard phrases may be loaded into the MEED by default, an additional level of customization is provided to accommodate an individual user's messaging language and preferences.

In addition to adding their own acronyms and abbreviations to the system via the provided website, users may also select and record custom audio files for specific usage scenarios. In an implementation, custom audio files can be recorded in the vehicle, e.g., via the telematics unit, via the website provided by the service provider, via interactive voice response (IVR), or other tool and then sent to the in-vehicle module.

Each item is assignable either universally or for specific contacts (e.g., as identified by the Mobile Directory Number (MDN) of the message sender). As a result, the user may be given a different experience depending on the message originator or other factors.

In a further implementation, a messaging content lookup engine (MCLE) is configured to recognize content in messages, e.g., in the case of content that may not have been strictly defined previously by the system or the user. For example, an incoming message may contain content that specifies a physical location or address, that points to external content, e.g., via a URL, to be retrieved if appropriate, or that can be interpreted to require or suggest an action. The MCLE will recognize this and determine how to present that information to the user.

Thus, for example, if a user receives a message that contains the text "hey we r up @john's grill u should join," the system can perform an automatic point of interest (POI) or address lookup based on the usage context of the "@" character, and may then provide the outcome to the user after the initial message is read. Thus, in this specific example, the system may provide an audio message to the user as follows: "hey we are up at john's grill you should join; would you like directions to john's grill?"

Other configuration options include the ability to use displays and functions in the vehicle as part of the messaging experience engine, including heads up display (HUD), driver information center (DIC), or directed audio/single speaker for private messages when other vehicle occupants are detected. A navigation screen may also be employed as part of displaying the mood of a message via color tint, for example, or to display a point of interest (POI) as part of MCLE.

The use of custom recordings for contacts is an important benefit in one implementation. There are four primary channels through which a user may customize audio. These include in-vehicle recording, recording via IVR remotely with the IVR being part of the telematics module (in this case, the caller's MDN may be recognized while in this setting mode), recording via the call center IVR (which then uploads the sound files to the vehicle separately) and recording via the website, where the user directly records sounds or uploads sound files.

When using IVR for recording, IVR provides a step-by-step recording session to obtain audio files for the main phrases/words/sounds to use in the vehicle. The recordings may be based requests made by the vehicle owner through the web interface. For example, a user may request that all contacts record two versions of their laugh. Then when a message "lol" (laughing out loud) is received, the short duration laugh may be played, while the longer version may be played for a message "rofl" (rolling on floor laughing).

The system described above, and described in greater detail hereinafter, provides a number of benefits to users and businesses alike. For example, the system assists users in adhering to "texting while driving" laws and thus presents a selling point for automobile purchasers.

The system also increases the amount of personalization possible for the in-vehicle text messaging experience where conventional displays cannot be used, thus keeping in-vehicle text messaging fun and light, while accommodating current behaviors/standards. Moreover, in some implementations, the system is able to utilize speech-to-text and text-to-speech capabilities already included in the vehicle. Furthermore, the web interface for customization serves to drive users to the service provider's website.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of an exemplary vehicle environment within which aspects of the invention may be implemented.

With reference to FIG. 1 there is shown an example of a communication system 100 that may be used with the present system and method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method or form part of the present system as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI)

technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
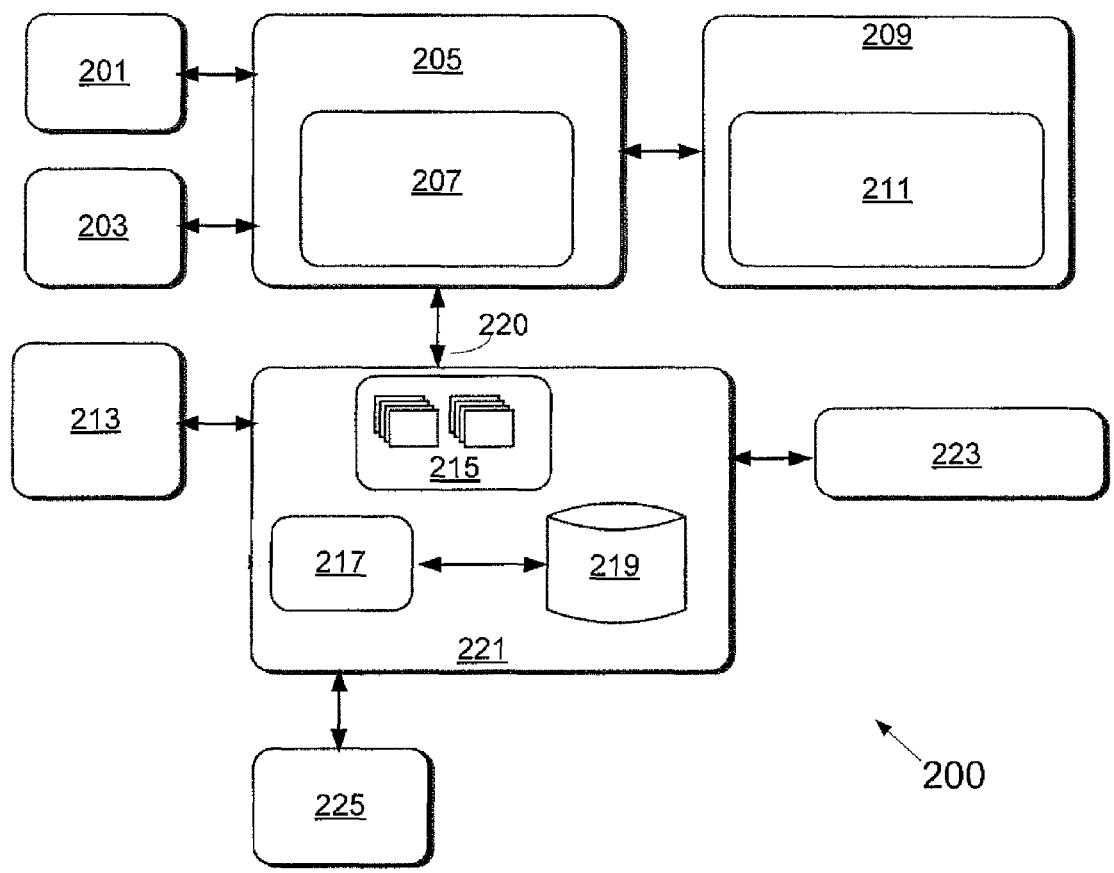
FIG. 2 is a schematic diagram of a text processing system and structure in accordance with the described principles.

Within this context, the described system operates to enhance the user's texting experience as described above. The architecture that specifically assists in this experience is shown schematically in FIG. 2. In particular, FIG. 2 is a schematic diagram illustrating components local to the vehicle and remote components that interoperate to enhance the user's texting experience. The illustrated system 200 includes several user input options for configuring the response of the system 200, including a web portal 201 and a voice interface 203 linked to the service provider backend systems 205. The web portal 201 and a voice interface 203 allow the user to set system options and settings including personalized user data for the MCLE and MEED, and to provide audio files as discussed above. This collection of data is referred to by reference numeral 207.

The service provider backend systems 205 are also communicably linked to a web data source or sources 209, e.g., to locate and obtain media information, current information regarding usage, and so on. A specific illustrated example of information serving a translation information includes abbreviation/short-hand databases, audio file sources, etc. 211 located within the web data source or sources 209.

The service provider backend systems 205 are linked to and accessed by the telematics module 221 (114) via a data link 220. The telematics module 221 includes the MCLE 217 and several systems linked to the MCLE 217 including a collection of audio files 215 and the MEED 219.

The telematics module 221 is also linked to the user via a direct telematics voice interface 213 to receive user voice commands and/or data for translation and/or execution. Vehicle audio/display systems 223 are linked to the telematics module 221 to provide audio and/or visual information to the user of the vehicle and associated telematics unit 221.

A wireless user device 125 such as a cell phone may be linked to the telematics module 221 to receive information from and pass information to the user. Communications between the telematics module 221 and the wireless user device 125 may be executed by way of a short range wireless protocol such as BLUETOOTH, or may be facilitated via a hard wired interface such as USB (e.g. a dock). Incoming text messages may be received by either the telematics system directly or via the paired Bluetooth or other device.

Figure 3:
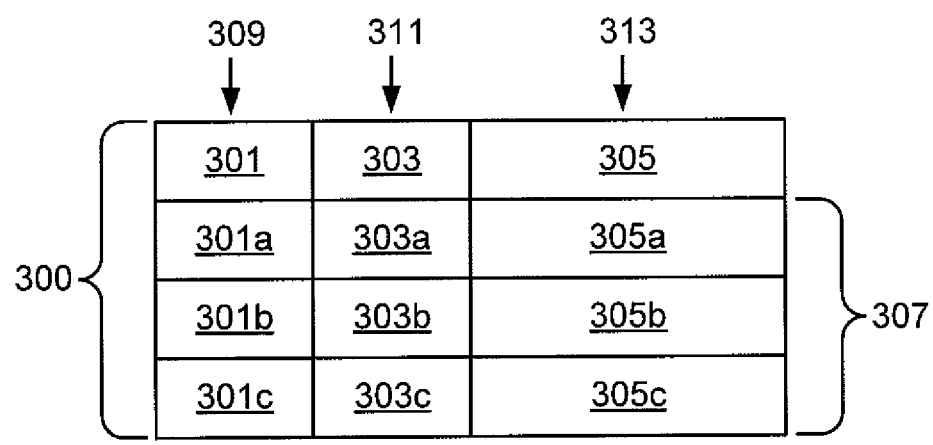
FIG. 3 is a data structure diagram showing a data structure used by the messaging content lookup engine to translate content in accordance with the described principles.

Focusing more specifically on the MEED (messaging experience engine database) and the MCLE 217 (messaging content lookup engine), FIG. 3 illustrates an example of a MEED data structure for resolving incoming information into outgoing content to convey to the user of the telematics unit 221. The illustrated data structure 300 includes a number of correlated multi-value fields. In the example, these fields include an originating contact field 301, an input field 303, and an output field 305. Entries in the originating contact field 301 indicate, e.g., by MDN, phone number, etc., from whom (i.e., from who's device) the incoming message originated, while entries in the input field 303 indicate the content of the incoming message. Entries in the output field 305 indicate the content to which a particular incoming message from a particular source should be translated for transmission to the user via the audio or visual facilities associated with the system.

Thus, entries in the fields are correlated such that an entry 301a in the originating contact field 301 is correlated to entry 303a in the input field 303, and hence with entry 305a in the output field 305. Thus, an example of MEED content for translation is as shown in Table 1:

TABLE 1

| ORIGINATING CONTACT | IN | OUT |
|---|---|---|
| 313-555-1234 | :) | Happy sound #3 (user selected) |
| 248-222-9876 | :) | Happy sound (custom user recording: Mike happy) |
| All | :( | Sad sound #1 (default) |
| All | ;) | Wink sound #2 (user selected) |
| 313-555-1234 | lol | Laughing sound (custom user recording: Sarah's laugh) |
| All | lol | Laughing sound #1 (default) |
| All | sigtgfm (custom) | Movie sound clip "[funny movie soundclip]" |

So for example, if a text of content "lol" is received from sender "313-555-1234," then the illustrated MEED table would result in user output of a laughing sound which is a custom recording of Sarah's laugh. On the other hand, if a text of content "lol" is received from any other sender ("All") then the illustrated MEED table would result in user output of a default laughing sound. The MEED will typically contain mappings and instructions other than those illustrated, and indeed will typically further contain mappings and instructions unrelated to the mapping of senders/contents to output content.

In an implementation, the user is able to select an overall theme of sounds to use as a default via the website interface. For example, themes could include a medieval theme, wherein the default laugh is a booming royal laugh, or a techno theme, wherein the default laugh is a robotic laugh, and so on. The various sounds would fit within the theme. In a further implementation, packages of themed sounds are available for purchase via the website.

As noted, the MCLE recognizes content in messages that may not have been strictly defined by the system or the user. For example, the MCLE may recognize a URL pointing to external audio and/or video content, or may recognize a symbol as preceding a location. In response, the MCLE executes certain default, learned, or user-defined actions to improve and simplify the user texting experience. For example, the MCLE may parse incoming texts for characters, terms, phrases, and their context, and may execute actions based on detecting certain items in certain contexts. Thus, in an implementation, the MCLE detects the use of the "@" symbol, and determines based on context whether the symbol is being used to identify a location, such as a geographic location or a business. One option for making this determination is to search the words appearing after the "@" symbol in groups of one, two, and three, until a location/establishment is identified or the possible searches are exhausted.

Thus, for example, an incoming text message "meet @ joe's bbq tonite" may trigger a search due to the use of the "@" symbol in a context that does not match an email format. In response, the MCLE may first search "joe's" but may retrieve too many hits to localize to a single point of interest. The MCLE may then may search "joe's bbq," resulting in 10 hits, one of which is local to the user. The MCLE will then retrieve directions or other relevant information such as hours, reviews, etc., and offer such further information to the user after playing the incoming text as speech.

In an alternative implementation, when the system identifies a number of candidate locations, the system presents the choices to the user. The user may then select the appropriate choice from among the presented options.

The MCLE may use local or remote databases and collections for the searching task. For example, a search of local businesses in a navigational unit data base/memory may sometimes be more efficient than performing an internet search.

The MCLE is also configured in an implementation to recognize other functional content, such as indicators regarding urgency, privacy, and so on. For example, the strings "(P)", "Priv" or "Private" are sometimes used in incoming texts to signal that the incoming message is intended solely for the addressee, e.g., as in "(p) have a surprise, don't tell . . . ". In such cases, the MCLE may detect the functional string and select a display mode, i.e., HUD or other private vehicle display or audio device to convey the incoming message to the user.

Figure 4:
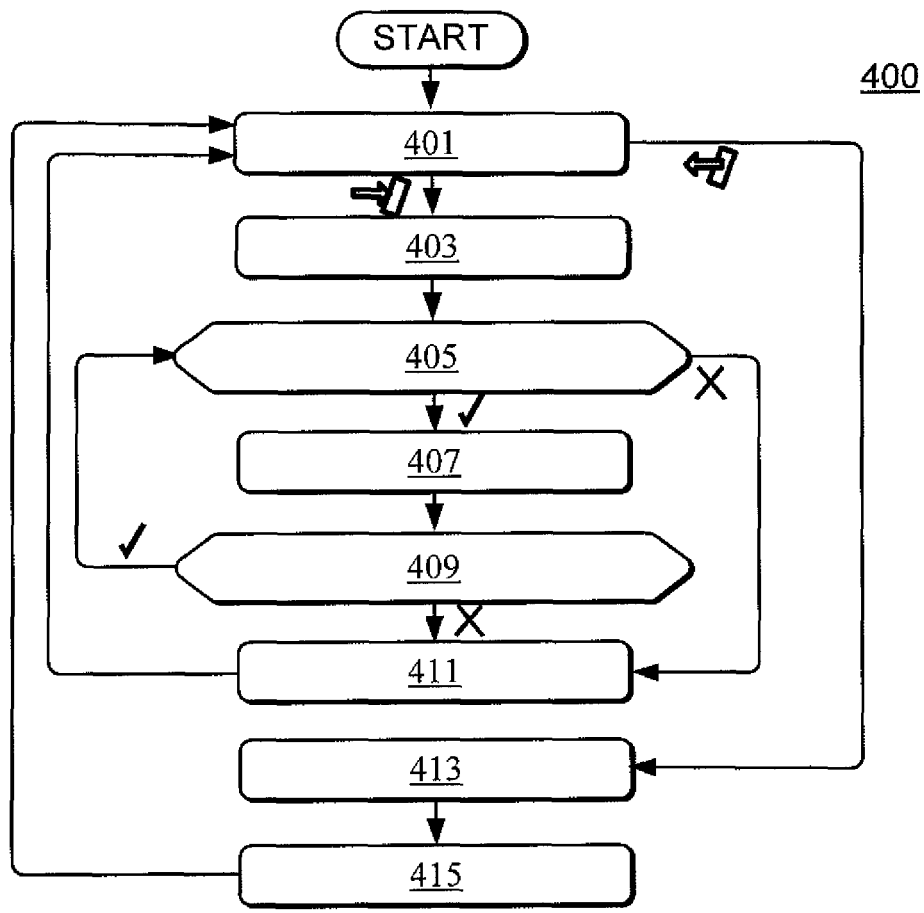
FIG. 4 is a flow chart illustrating a process for enhancing the user texting experience while processing incoming and outgoing text messaging in accordance with the described principles.

As noted earlier herein, the MCLE executes various processes to improve the user texting experience. An exemplary such process is illustrated in the flow chart of FIG. 4. In particular, FIG. 4 illustrates a process 400 for enhancing the user texting experience applying the described principles. At stage 401 of the process 400, the MCLE awaits actionable input, including either an incoming text message or user speech indicating an outgoing text message.

If the MCLE detects an incoming text message, i.e., via the user cellular device paired to the telematics unit or via the telematics unit itself, the process flows to stage 403. The MCLE parses the incoming text message into units, i.e., special characters such as "@" or groups of letters standing alone, at stage 403. Thus, "meet @joe's bbq" may be parsed into "meet", "@", "joe's" and "bbq."

Having parsed the incoming content, the MCLE determines whether any action units (characters, terms, or phrases) are present in the within the set of parsed text units at stage 405. Action units include, for example, but are not limited to: "lol", "ttyl", "@", "(p)", "(P)", and so on. There may be a single action unit or multiple action units in a given text message. Action units can generally be categorized into action units that signify how to treat the message (e.g., as private), how to supplement the message (i.e., to supplement a location with an offer of directions), or how to translate the message (i.e., to play an audible laugh instead of speaking "lol" or "laughing out loud.")

Based on user settings and the sender of the incoming text, the speech and audible utterances played by the system may be male or female. For example, a text from a male acquaintance that contains text and the unit "lol" may be translated into corresponding male speech and a male laugh, whereas the same text from a female acquaintance would be translated to female speech and a female laugh. Via any of the input methods mentioned herein, the user may set a gender associated with each of their various contacts.

If it was determined at stage 405 that action units are present within the set of parsed text units, the MCLE executes a first action unit at stage 407. Within process 400, the execution of an action unit entails taking all steps necessary to enable the relevant portion of the text to then be played/displayed. When multiple action units are present, the order of execution may be set in any desired manner, but a preferred manner is to execute such units in the order in which they appear in the text.

Having executed a first action unit at stage 407, the MCLE determines at stage 409 whether there is another action unit in the parsed text message. If there is another action unit, the process 400 returns to stage 405 to execute the next and subsequent action units as they appear. If no further action units are detected at stage 405, the process 400 then flows to stage 411, wherein the incoming text message is conveyed to the user, including any translations, supplementations, and in any modes of presentation indicated by the action units, if any. At this point, the process 400 returns to stage 401 to await an incoming text message or user speech indicating an outgoing text message.

If at stage 401 it was instead detected that the user has uttered speech or otherwise activated a selection indicative of an outgoing text message, the process 400 flows to stage 413, wherein the MCLE translates the user speech into text. At stage 415, the MCLE optionally applies some or all of the text enhancement techniques described above to the outgoing text message as well. For example, if the user utters "meet me at bob's tavern instead," the MCLE may translate this to "meet me at bob's tavern instead; do you wish directions to bob's tavern?" Subsequently, the process 400 returns to stage 401 to again await actionable input.

In an implementation regarding the above example, an affirmative response, e.g., a return text including the words "OK," or "yes" along with "directions," would be identified as an action unit by the MCLE, which may send directions in response.

From this description, it will be appreciated that the disclosed principles provide a system and method for enhancing a user texting experience within a telematics equipped vehicle. It will also be appreciated, however, that the described systems, methods and implementations are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for processing text messages sent to a telematics unit of a telematics-equipped vehicle, the method comprising:
    receiving, by the telematics unit, a text message via a network;
    detecting, by the telematics unit, that the text message includes a privacy indicator, wherein detecting that the text message includes a privacy indicator comprises detecting that the text message contains a predetermined character string; and
    processing, by the telematics unit, the text message based on the privacy indicator, wherein the processing of a text message including a privacy indicator is different from processing of a text message that does not include a privacy indicator.

2. The method of claim 1, wherein processing the text message based on the privacy indicator comprises:
    converting the text message into audio; and
    utilizing a subset of speakers of the vehicle to play the audio so as to direct the audio to an occupant of the vehicle.

3. The method of claim 1, wherein the predetermined character string is selected from the group consisting of "(P)", "Priv", and "Private".

4. The method of claim 1, wherein processing the text message based on the privacy indicator comprises:
    utilizing a private vehicle display so as to display the text message to an occupant of the vehicle.

5. A non-transitory computer-readable medium, part of a telematics unit of a telematics-equipped vehicle, having processor-executable instructions stored thereon for processing text messages sent to the telematics unit, the processor-executable instructions comprising instructions for:
    receiving a text message via a network;
    detecting that the text message includes a privacy indicator, wherein detecting that the text message includes a privacy indicator comprises detecting that the text message contains a predetermined character string; and
    processing the text message based on the privacy indicator, wherein the processing of a text message including a privacy indicator is different from processing of a text message that does not include a privacy indicator.

6. The non-transitory computer-readable medium of claim 5, wherein processing the text message based on the privacy indicator comprises:

converting the text message into audio; and utilizing a subset of speakers of the vehicle to play the audio so as to direct the audio to an occupant of the vehicle.

7. The non-transitory computer-readable medium of claim 5, wherein the predetermined character string is selected from the group consisting of "(P)", "Priv", and "Private".

8. The non-transitory computer-readable medium of claim 5, wherein processing the text message based on the privacy indicator comprises:

utilizing a private vehicle display so as to display the text message to an occupant of the vehicle.

* * * * *